(12) United States Patent
No

(10) Patent No.: US 8,616,346 B2
(45) Date of Patent: Dec. 31, 2013

(54) ELECTRIC DISC BRAKE

(75) Inventor: Su Hwan No, Gyeonggi-do (KR)

(73) Assignee: MANDO Corporation, Pyeongtaek-si, Gyeonggi-do (KR)

( * ) Notice: Subject to any disclaimer, the term of this patent is extended or adjusted under 35 U.S.C. 154(b) by 87 days.

(21) Appl. No.: 13/105,997

(22) Filed: May 12, 2011

(65) Prior Publication Data

US 2011/0278109 A1    Nov. 17, 2011

(30) Foreign Application Priority Data

May 12, 2010    (KR) .................. 10-2010-0044707

(51) Int. Cl.
*F16D 55/08*    (2006.01)

(52) U.S. Cl.
USPC .......... 188/72.1; 188/18 A; 188/156; 188/158

(58) Field of Classification Search
USPC ............. 188/18 A, 72.1, 72.6, 156, 158, 162;
475/149, 150, 153, 154, 155, 156
See application file for complete search history.

(56) References Cited

U.S. PATENT DOCUMENTS

| | | | | |
|---|---|---|---|---|
| 4,189,960 A | * | 2/1980 | Holdeman | 475/298 |
| 4,836,338 A | * | 6/1989 | Taig | 188/72.1 |

FOREIGN PATENT DOCUMENTS

| | | |
|---|---|---|
| DE | 689 07 481 | 12/1993 |
| DE | 198 51 670 | 5/2000 |
| DE | 10-2005-055084 | 4/2007 |
| JP | 2000-329175 | 11/2000 |
| KR | 10 2000 0 014 476 | 3/2000 |
| KR | 10-2010-084177 | 7/2010 |

OTHER PUBLICATIONS

German Office Action, and English translation thereof, issued in German Patent Application No. 10-2011-100-718.4 dated Mar. 15, 2012.

* cited by examiner

*Primary Examiner* — Bradley King
*Assistant Examiner* — Vu Q Nguyen
(74) *Attorney, Agent, or Firm* — McDermott Will & Emery LLP

(57) ABSTRACT

Disclosed is an electric disc brake including a reduction unit having a transmission function. The electric disc brake includes a piston in the caliper housing such that the piston is movable back and forth to press one frictional pad, a spindle unit including a nut spindle member allowing the piston to move back and forth and a spindle member screwed with the nut spindle member, and a reduction unit coaxially coupled with the spindle unit, and a motor rotating the reduction unit forward and backward. The reduction unit includes a sun gear coupled with a shaft of the motor, a planet gear, a carrier coupled with the planet gear to rotate the spindle member, and first and second internal gears engaged with the planet gear to amplify a rotational force of the motor or transfer the rotational force of the motor to the spindle member without a reduction gear ratio.

7 Claims, 3 Drawing Sheets

ELECTRIC DISC BRAKE

This application claims the benefit of Korean Patent Application No. 10-2010-0044707 filed on May 12, 2010, in the Korean Intellectual Property Office, the disclosure of which is incorporated herein by reference.

BACKGROUND

1. Field

The disclosure relates to an electric disc brake including a reduction unit equipped with a transmission function.

2. Description of the Related Art

In general, an electric disc brake is different from a typical hydraulic disc brake in that the electric disc brake employs an electric motor as a driving source of a driving device pressing frictional pads.

An example of the electric disc brake is disclosed in Korean Unexamined Patent Publication No. 2000-0014476. The disclosed electric disc brake includes a disc rotating together with a wheel of a vehicle, first and second frictional pads provided at both sides of the disc to press the disc, a piston to move back and forth to press the first and second frictional pads, a motor generating a driving force, a reduction unit amplifying the driving force generated from the motor, and a spindle unit transferring the rotational force of the motor to the piston from the reduction unit.

However, the electric disc brake has a limitation in that the electric disc brake includes a reduction unit without a transmission function.

SUMMARY

Accordingly, it is an aspect of the disclosure to provide an electric disc brake including a reduction unit equipped with a transmission function.

Additional aspects and/or advantages of the disclosure will be set forth in part in the description which follows and, in part, will be apparent from the description, or may be learned by practice of the disclosure.

The foregoing and/or other aspects of the disclosure are achieved by an electric disc brake including frictional pads to press a disc, a carrier supporting the frictional pads, a caliper housing supported to the carrier such that the caliper housing is movable back and forth to press the frictional pads, and a pressing unit pressing the frictional pads.

The pressing unit includes a piston installed in the caliper housing such that the piston is movable back and forth to press one of the frictional pads, a spindle unit including a nut spindle member allowing the piston to move back and forth and a spindle member screwed with the nut spindle member, and a reduction unit coaxially coupled with the spindle unit, and a motor rotating the reduction unit forward and backward.

The reduction unit includes a sun gear coupled with a shaft of the motor, a planet gear engaged with the sun gear, a carrier coupled with the planet gear to rotate the spindle member, and an internal gear engaged with the planet gear to amplify a rotational force of the motor or transfer the rotational force of the motor to the spindle member without a reduction gear ratio.

The internal gear includes a first internal gear and a second internal gear rotatably mounted on an inner surface of the first internal gear.

The first internal gear has gear teeth aligned in line with gear teeth of the second internal gear.

The first internal gear is a stationary internal gear.

The second internal gear is a rotary internal gear rotating in the first internal gear.

The planet gear is engaged with the second internal gear before the nut spindle member makes contact with the piston as the motor rotates.

The planet gear is engaged with the first internal gear as the spindle member is pushed to the reduction unit if the nut spindle member makes contact with the piston.

According to the electric disc brake of the disclosure, the reduction unit includes the first and second internal gears, and the planet gear is selectively engaged with the first or second internal gear according to the load state of the piston. Accordingly, the rotational force of the motor can be amplified and transferred to the spindle member or can be transferred to the spindle member without the reduction gear ratio.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

Figure 1:
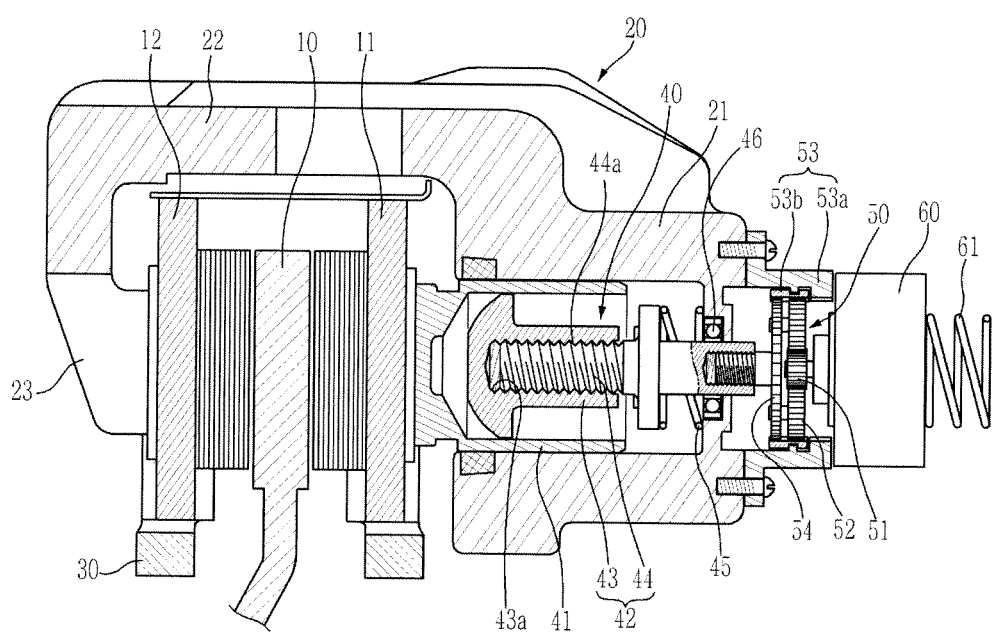
FIG. 1 is a sectional view showing a no-load case in an electric disc brake according to the disclosure.

Reference will now be made in detail to the embodiments of the disclosure, examples of which are illustrated in the accompanying drawings, wherein like reference numerals refer to the like elements. The embodiments are described below to explain the disclosure by referring to the figures.

Hereinafter, an exemplary embodiment of the disclosure will be described in detail with reference to accompanying drawings.

Figure 2:
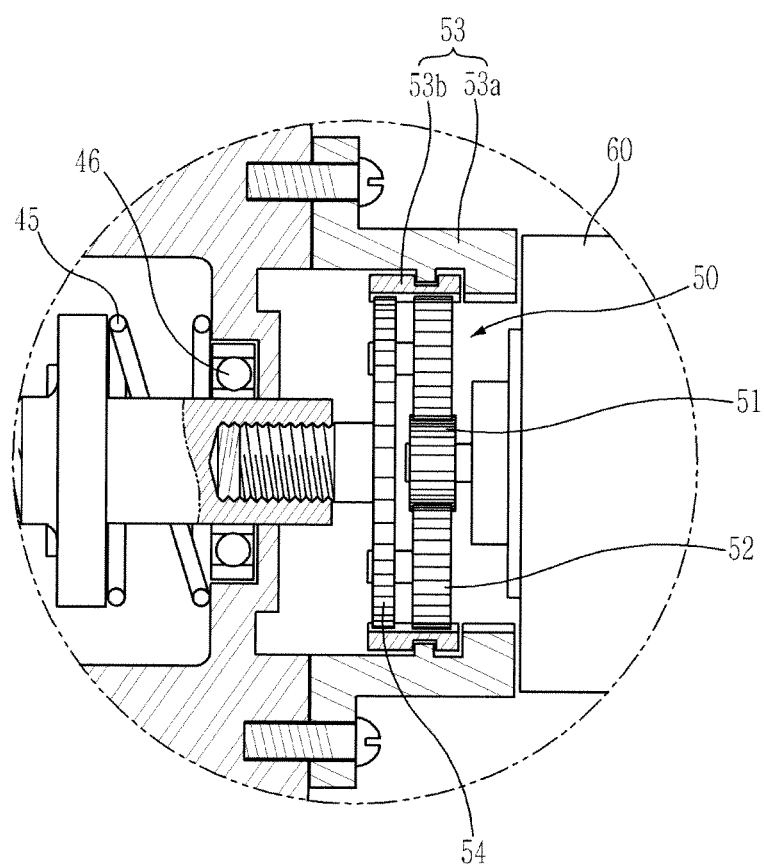
FIG. 2 is an enlarged sectional view showing a portion of FIG. 1.
Figure 3:
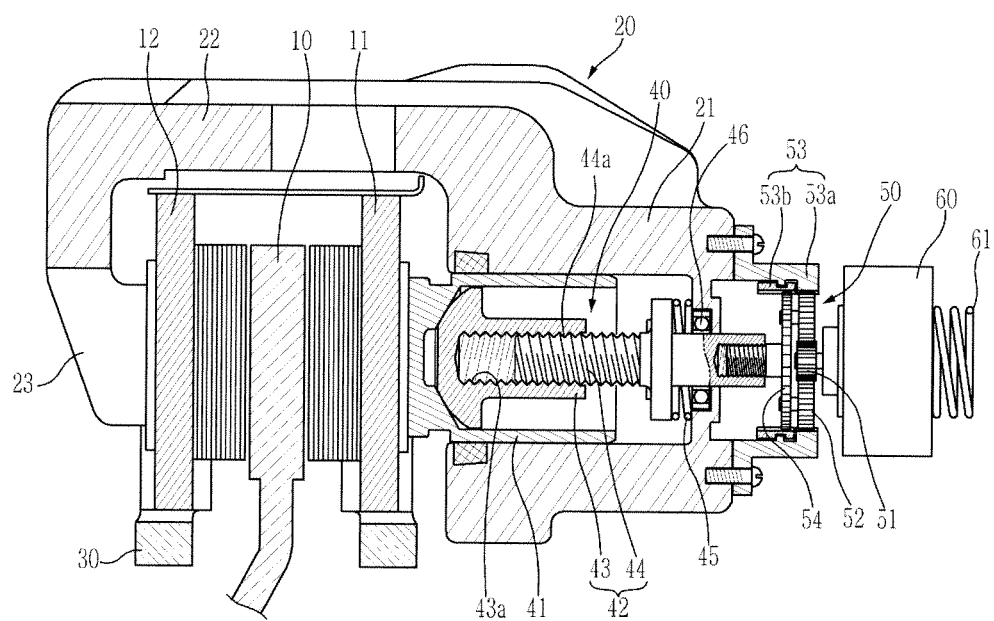
FIG. 3 is a sectional view showing a load case in the electric disc brake according to the disclosure.

As shown in FIGS. 1 and 2, an electric disc brake according to the disclosure includes a disc 10 rotating together with a wheel of a vehicle, first and second frictional pads 11 and 12 provided at both sides of the disc 10 to press both lateral surfaces of the disc 10 so that braking is performed, a caliper housing 20 to press the first and second frictional pads 11 and 12, and a pressing unit 40 installed in the caliper housing 20 for the purpose of a braking operation.

The first and second frictional pads 11 and 12 are supported to a carrier 30, which is fixed to a vehicle body, so that the first and second frictional pads 11 and 12 is movable back and forth with respect to both lateral surfaces of the disc 10, and the caliper housing 20 is supported to the carrier 30 so that the caliper housing 20 is movable in a direction to press the first and second frictional pads 11 and 12.

The caliper housing 20 includes a hollow-type body section 21, an extension section 22 extending toward the second frictional pad 12 from the body section 21, and a finger section 23 coupled with the extension section 22 to support one surface of the second frictional pad 12. The pressing unit 40 is installed in the body section 21 of the caliper housing 20 so that the pressing unit 40 presses the first frictional pad 11.

The pressing unit 40 includes a piston 41 installed in the body section 21 of the caliper housing 20 such that the piston 41 is movable back and forth to press the first frictional pad 11 or release the pressing of the first frictional pad 11, a spindle unit 42 allowing the piston 41 to move back and forth, a reduction unit 50 coaxially coupled with the spindle unit 42, and a motor 60 rotating the reduction unit 50 forward or backward.

The piston 41 is prepared in the form of a cylinder having a cup-shape inner part and slidably inserted into the body section 21. The piston 41 presses the first frictional pad 11 toward the disc 10 by thrust force mechanically or hydraulically produced.

The spindle unit 42 presses the piston 41 toward the first frictional pad 11 as described above. The spindle unit 42 includes a nut spindle member 43 having a female screw section 43a and a spindle member 44 having a male screw section 44a engaged with the female screw section 43a of the nut spindle member 43.

The spindle member 44 is screwed with a rotational shaft of a carrier 54 of the reduction unit 50, which is described later, to receive the rotational force of a motor 60. As shown in drawings, the spindle member 44 is elastically supported by a first elastic member 45 inside the body section 21. In addition, a bearing 46 is installed in the body section 21 to support the spindle member 44.

The reduction unit 50 includes a sun gear 51 mounted on a shaft of the motor 60, a plurality of planet gears 52 provided around the sun gear 51 and engaged with the sun gear 51, internal gears 53 fixed to outer portions of the planet gears 52 and engaged with the planet gears 52, and the carrier 54 coupling shafts of the planet gears 52 with the spindle unit 42.

The internal gears 53 include a first internal gear 53a and a second internal gear 53b rotatably mounted on the inner surface of the first internal gear 53a.

The first internal gear 53a is prepared in the form of a stationary internal gear. If the nut spindle member 43 approaches the piston 41, an axial force is produced so that the spindle member 44 is pushed toward the reduction unit 50 to make contact with the planet gear 52. In this case, the first internal gear 53a amplifies the torque of the motor 60 corresponding to the reduction gear ratio of the planet gear 52 to produce the axial force.

The second internal gear 53b is prepared in the form of a rotary internal gear. As shown in drawings, the second internal gear 53b has gear teeth aligned in line with gear teeth of the first internal gear 53a. The planet gear 52 is engaged with the second internal gear 53b before the nut spindle member 43, which applies the axial force to the piston 41, approaches the piston 41. In this case, the carrier 54 rotates the spindle member 44 corresponding to the rotational speed of the motor 60 without the reduction gear ratio of the planet gear 52, thereby reducing approach time of the nut spindle member 43 to the piston 41.

Reference number 61 indicates a second elastic member to elastically support the motor 60.

Hereinafter, the operation of the electric disc brake having the above structure will be described.

If the motor 60 rotates for the purpose of braking, the motor 60 rotates the reduction unit 50 coupled with the motor 60. The reduction unit 50 is rotated by the rotational force of the motor 60 to amplify the rotational force of the motor 60 and transfer the rotational force to the spindle member 44 or transfer the rotational force of the motor 60 to the spindle member 44 without the reduction gear ratio. The spindle member 44 rotates the nut spindle member 43 to allow the nut spindle member 43 to approach the piston 41. The piston 41 presses the first frictional pad 11 toward the disc 10 by the nut spindle member 43.

In detail, the motor 60 rotates the sun gear 51 engaged with the shaft of the motor 60. The sun gear 51 rotates the planet gear 52 engaged with the sun gear 51. The planet gear 52 rotates the second internal gear 53b together with the carrier 54 engaged with the planet gear 52. The carrier 54 rotates the spindle member 44 screwed with the carrier 54.

In the above procedure, the planet gear 52 is engaged with the second internal gear 53b and the carrier 54 as described above. Accordingly, the spindle member 44 receives the rotational speed of the motor 60 without the reduction gear ratio of the planet gear 52 and rotates.

In other words, according to the embodiment of the disclosure, since the spindle member 44 can be rotated at the rotational speed of the motor 60 without the reduction gear ratio of the planet gear 52, the approach time of the nut spindle member 43 to the piston 41 can be reduced.

In addition, in the above procedure, if the spindle member 44 is continuously rotated so that the nut spindle member 43 approaches the piston 41, a reaction force is produced due to the pressing of the piston 41, so that the spindle unit 42 including the nut spindle member 43 and the spindle member 44 is pushed in an opposite direction. As the spindle unit 42 is pushed in the opposite direction, the planet gear 52 is engaged with the first internal gear 53a. Accordingly, the spindle member 44 amplifies the torque of the motor 60 corresponding to the reduction gear ratio of the planet gear 52 to produce an axial force.

Therefore, according to the embodiment of the disclosure, when the motor 60 is rotated to allow the piston 41 to press the first frictional pad 11, in a no-load case that the nut spindle member 43 does not make contact with the piston 41, the planet gear 52 is engaged with the second internal gear 53b to transfer the rotational speed of the motor 60 to the spindle member 44 without the reduction gear ratio of the planet gear 52. In a load case that the nut spindle member 43 makes contact with the piston 41 to produce a reaction force, the planet gear 52 is engaged with the first internal gear 53a so that the torque of the motor 60 is amplified corresponding to the reduction gear ratio of the planet gear 52 and transferred to the spindle member 44.

Although few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:
1. An electric disc brake comprising:
frictional pads to press a disc;
a first carrier supporting the frictional pads;
a caliper housing supported to the carrier such that the caliper housing is movable back and forth to press the frictional pads; and
a pressing unit pressing the frictional pads,
wherein the pressing unit comprises:
a piston installed in the caliper housing such that the piston is movable back and forth to press one of the frictional pads;
a spindle unit including a nut spindle member allowing the piston to move back and forth and a spindle member screwed with the nut spindle member; and
a reduction unit coaxially coupled with the spindle unit, and a motor rotating the reduction unit forward and backward, and
wherein the reduction unit comprises:
a sun gear coupled with a shaft of the motor;
a planet gear engaged with the sun gear;

a second carrier coupled with the planet gear to rotate the spindle member; and an internal gear engaged with the planet gear, wherein the internal gear and planet gear are arranged such that in a first position the internal gear and planet gear are engaged to amplify a rotational force of the motor and in a second position the internal gear and planet gear are engaged to transfer the rotational force of the motor to the spindle member without a reduction gear ratio, and wherein the internal gear and planet gear shift from the second position to the first position after the spindle unit presses the piston.

2. The electric disc brake of claim 1, wherein the internal gear comprises a first internal gear and a second internal gear rotatably mounted on an inner surface of the first internal gear.

3. The electric disc brake of claim 2, wherein the first internal gear has gear teeth aligned in line with gear teeth of the second internal gear.

4. The electric disc brake of claim 2 or claim 3, wherein the first internal gear is a stationary internal gear, and the second internal gear is a rotary internal gear rotating in the first internal gear.

5. The electric disc brake of claim 4, wherein the planet gear is engaged with the second internal gear before the nut spindle member makes contact with the piston as the motor rotates.

6. The electric disc brake of claim 4, wherein the planet gear is engaged with the first internal gear as the spindle member is pushed to the reduction unit if the nut spindle member makes contact with the piston.

7. The electric disc brake of claim 1, wherein the internal gear comprises a stationary first internal gear and a rotatable second internal gear, the planet gear is engaged with the stationary first internal gear in the first position, and the planet gear is engaged with the rotatable second internal gear in the second position.

\* \* \* \* \*